United States Patent [19]
Daskivich

[11] 3,811,903
[45] May 21, 1974

[54] SILICONE COATED INJECTION MOLDABLE THERMOPLASTIC MATERIAL

[75] Inventor: Michael Daskivich, Cleveland, Ohio

[73] Assignee: Precision Metalsmiths, Inc.,, Cleveland, Ohio

[22] Filed: Feb. 8, 1973

[21] Appl. No.: 330,706

Related U.S. Application Data

[63] Continuation of Ser. No. 133,363, April 12, 1971, abandoned.

[52] U.S. Cl. ..... 106/187, 260/27 EV, 260/28.5 AV, 260/29.1 SB, 264/211
[51] Int. Cl. ...................... C08b 21/08, C08f 45/52
[58] Field of Search ............ 260/28.5 AV, 29.1 SB; 264/211; 106/38.8, 38.23, 38.22, 187; 164/35; 117/100 C

[56] References Cited
UNITED STATES PATENTS

| | | | |
|---|---|---|---|
| 3,619,267 | 11/1971 | Weissermel et al. | 117/100 C |
| 2,846,458 | 8/1958 | Haluska | 106/38.22 |
| 3,296,063 | 1/1967 | Chandler | 264/211 |
| 3,712,872 | 1/1973 | Lammers et al. | 264/310 |
| 3,017,714 | 1/1962 | Slosberg et al. | 41/17 |
| 3,361,688 | 1/1968 | Banitz et al. | 117/100 C |

*Primary Examiner*—Allan Lieberman
*Attorney, Agent, or Firm*—Watts, Hoffman, Fisher & Heinke Co.

[57] ABSTRACT

Granules of solid, wax containing injection moldable, thermoplastic composition are coated with a silicone fluid to provide a material which is especially useful for making injection molded patterns to be used in the lost pattern processes of investment casting.

12 Claims, No Drawings

SILICONE COATED INJECTION MOLDABLE THERMOPLASTIC MATERIAL

CROSS-REFERENCE TO RELATED APPLICATION

This application is a continuation of application, Ser. No. 133,363, filed Apr. 12, 1971 and for Pattern Material, and now abandoned.

BACKGROUND OF THE INVENTION

The present invention relates generally to injection molding materials, and more specifically to new and useful improvements in materials for injection molding casting patterns to be used in the lost pattern processes of investment casting.

Considerable work has been done in recent years to provide improved pattern materials which can be injection molded in the manner of conventional plastics, such as polystyrene, and which can be eliminated from solid investment molds and ceramic shell molds in the manner of conventional pattern waxes. This work has led to the development of wax containing thermoplastic compositions in which the wax is preferably blended with one or more compatible resins. Such compositions are described in U.S. Pat. No. 3,263,286 issued Aug. 2, 1966 to C. H. Watts et al, entitled PROCESS AND MATERIAL FOR PRECISION INVESTMENT CASTING, and U.S. Pat. No. 3,296,006 issued Jan. 3, 1967 to R. A. Horton, entitled PATTERN MATERIAL COMPOSITION.

The compositions disclosed in the above-referenced patents can be injection molded under heat and pressure on conventional plastic injection molding machines to form casting patterns. The patterns made from the wax and resin base compositions exhibit low volumetric expansion when heated and have the characteristic of surface melting when "torched" or exposed to temperatures in the range of from about 1,600° to 2,000°F. Because of these characteristics, the patterns can be eliminated from solid investment molds and shell molds by heating, such as by flash dewaxing procedures, without cracking the molds.

SUMMARY OF THE INVENTION

The present invention provides new and useful improvements in wax containing thermoplastic compositions, such as those described above, which enhance the injection molding characteristics of such compositions. The novel pattern materials of this invention are self-lubricating so that it is not necessary to lubricate the injection dies between every few shots as has been done in the past. The need for repeatedly lubricating the dies between shots when using conventional wax and resin base materials required the constant attendance of an operator. The self-lubricating property of the present material makes it possible to operate the injection molding machine automatically without an operator. The self-lubricating property of the new material also has resulted in reduced breakage of the molded patterns during their ejection from the dies.

It has been found that the new pattern material of this invention can be injected at lower temperatures than were previously required. For example, the compositions disclosed in U.S. Pat. No. 3,263,286 are typically injected at 150°–160°F., whereas the preferred materials of the present invention can be injected at temperatures of approximately 130°F. or lower. The new material can be successfully injected at temperatures so low that some of the individual granules are incompletely melted and can be seen as discrete particles in the molded patterns which are perfectly satisfactory for use. The use of lower injection temperatures reduces the occurrence of "sinks" or surface cavitations in the molded patterns and makes it possible to reduce the cycle times of the injection equipment. Since it is not necessary to completely melt all of the individual granules of the material, the capacity of the injection equipment may be increased in terms of volume of material processed per unit of time.

The pattern materials of this invention also exhibit improved flow characteristics and result in reduced air entrapment in the molded patterns. Air entrapment in casting patterns can result in weak surface portions which may break when the patterns are subjected to a vacuum during production of investment or shell molds. When this occurs, the investment material may penetrate into the damaged patterns so that the castings which are made in the molds have rough, unsatisfactory surfaces. It will be seen that by eliminating air entrapment in the patterns, the invention makes it possible to improve the quality of the castings which are made using the patterns.

These and other advantages are attained by providing a pattern material consisting essentially of a silicone fluid admixed with a wax containing, injection moldable, thermoplastic composition. More particularly, the invention comprehends a pattern material consisting essentially of at least 0.03% by weight of a silicone fluid admixed with an injection moldable, thermoplastic composition containing wax in an amount of at least 10% by weight. The more preferred thermoplastic compositions consist at least partially of a solidified blend of wax and compatible resins, such as described in U.S. Pat. Nos. 3,263,286 and 3,296,006.

Other advantages and a fuller understanding of the invention will be had from the following detailed description.

DESCRIPTION OF THE PREFERRED EMBODIMENTS

A major component of the new pattern material is a wax containing, thermoplastic composition which can be injection molded to produce disposable patterns for use in making solid investment molds and shell molds. The composition is injection moldable in the usual manner by feeding granules of the composition from a hopper into the heating cylinder of an injection machine and injecting the heat-softened plastic mass, in a flowable condition and under high pressure, from the heating cylinder into a closed die from which the molded pattern is then ejected. The patterns made from such compositions are characterized by low volumetric expansion and by their ability to be heated and melted, whereby the patterns can be conveniently eliminated from the refractory molds formed around the patterns.

Injection moldable, thermoplastic compositions of the type described above are known in the art. Such compositions are typically formulated to include wax in an amount of at least 10% by weight in order to obtain the desired properties which permit patterns made from the compositions to be heated and melted when eliminating the patterns from refractory molds. The wax or waxes used in the formulations are of the class of unctuous, fusible, variable viscous to solid substances having a characteristic waxy luster which are insoluble in water but are at least partially soluble in organic solvents. The useful waxes are characteristically composed of high molecular weight substances, and may be classified according to their origin as animal waxes, vegetable waxes, mineral waxes, and synthetic waxes. Typical animal waxes include such materials as spermaceti, beeswax, Chinese wax, stearic acid, and the like. Useful vegetable waxes include such materials as carnuba, Japan, bayberry, candelilla, lauric acid, and the like. The class of mineral waxes includes such materials as ozocerite, montan, ceresin, and petroleum waxes such as micro-crystalline waxes and paraffin waxes, and the like. The class of synthetic waxes includes materials such as Fisher-Tropsch wax, stearone, laurone, and the like.

The wax or waxes of the thermoplastic compositions are combined with a resin to impart toughness and provide the necessary strength and flexibility which make injection molding of the compositions possible. The preferred resins are compatible with the wax, i.e., the resin can be dissolved in the wax while molten and the melt cooled to obtain a solidified blend of wax and resin. Such resins include vinyl resins, especially ethylene/vinyl acetate polymers, ethyl cellulose, and the like. Other resins, both natural and synthetic, may be included in the compositions to contribute to the desired properties of dimensional stability, low thermal expansion and contraction, and ease of melting. Such additional resins are preferably characterized by a volumetric expansion of less than 5% when heated from 70° to 220°F., a softening point in the range of from about 130° to 250°F., and the capability of being heated to a low viscosity, mobile liquid. Useful natural resins of this type include polymerized or modified rosins, rosin derivatives, such as abietic acid, and the like. Useful synthetic resins include coumarone-indene resins, ester gums, and the like.

The thermoplastic compositions also may include fillers in amounts up to about 50% by weight for any desired purpose, such as to decrease the cost of the product, improve dimensional stability, etc.

A preferred injection moldable, thermoplastic composition is described in U.S. Pat. No. 3,263,286, the disclosure of which is incorporated herein by reference. The pattern material composition of that patent has the following distinguishing characteristics:

1. A softening point as distinguished by the A.S.T.M. ring and ball method (A.S.T.M. E28–51 T) in the range of from about 210°F. to about 220°F.
2. Injection moldable on a conventional plastic injection molding machine at a temperature in the range of from about 130°F. to about 250°F.
3. Immediate surface melting to a low viscosity liquid when subjected to high oven temperatures in the range of from about 1,600°F. to about 2,300°F.

The following is a general formulation for the pattern material composition exhibiting the foregoing properties:

| | Per Cent by Weight |
|---|---|
| Vinyl resin | 5 – 40 |
| Wax | 10 – 50 |
| Other Resins | 30 – 70 |

A more specific composition is as follows:

| | Per Cent by Weight |
|---|---|
| Ethylene/vinyl acetate polymer | 5 – 40 |
| Paraffin Wax | 10 – 30 |
| Other Resins | 30 – 70 |

Another specific composition is as follows:

| | Per Cent by Weight |
|---|---|
| Ethylene/vinyl acetate polymer | 5 – 20 |
| Extra hard, high melting point synthetic wax | 0 – 15 |
| Petroleum-base wax blend including a paraffin wax | 15 – 35 |
| Compatible resin | 30 – 50 |

The following is a still more specific composition:

| | Per Cent by Weight |
|---|---|
| Modified Pale Wood Rosin | 30 – 50 |
| Ethylene/vinyl acetate copolymer | 5 – 20 |
| Fischer-Tropsch Wax | 0 – 15 |
| Paraffin Wax | 10 – 20 |
| Microcrystalline Wax | 5 – 15 |

In preparing the above formulations, all of the ingredients except for the vinyl resin may be added to a wax melting kettle, such as an electrically heated wax melting pot or a jacketed kettle, which is capable of melting and heating the ingredients to a temperature in the range of from about 270°F. to about 300°F. The vinyl resin is subsequently added to the other melted ingredients while stirring and heating is continued to completely melt the vinyl resin and assure a uniform blend. The melt is then cooled to form solid blocks which are subsequently reduced to granules of a size that can be fed from the hopper into the injection cylinder of a plastic injection machine.

Another suitable injection moldable, thermoplastic composition is described in U.S. Pat. No. 3,296,006, the disclosure of which also is incorporated herein by reference. The pattern material composition of that patent has the following general formulation:

| | Per Cent by Weight |
|---|---|
| Ethyl cellulose | 20 – 70 |
| Fatty Acid Ketone | 20 – 80 |
| Plasticizer | 0 – 25 |
| Compatible waxes, Resins or solid fillers | 0 – 30 |

The preferred fatty acid ketones of the foregoing formulation are selected from the class consisting of laurone and stearone. Useful plasticizers include vegetable oils, such as castor oil, esters, hydroabietyl alcohol and the like.

In preparing the pattern material, the plasticizer and the ketone or ketones are first melted together and then the ethyl cellulose is added while stirring and heating. After all of the ethyl cellulose is dissolved, the molten, semi-viscous material is allowed to cool and is then reduced to granules of a size which can be fed from the hopper into the injection cylinder of a plastic injection machine.

In accordance with the present invention, a silicone fluid is admixed with the granules of a wax containing, injection moldable, thermoplastic composition, such as those described above, in order to improve the injection molding characteristics. The silicone fluid may be mixed with the solid granulated material in any suitable manner, such as by tumbling the granules in a rotating drum after adding the fluid.

Useful improvements in injection molding characteristics have been obtained using materials consisting of the thermoplastic compositions admixed with as little as 0.03% by weight silicone fluid. Pattern materials consisting of the wax containing thermoplastic compositions admixed with silicone fluid in amounts up to 6% by weight of the material also have been used with good results. While it is considered possible to successfully inject materials containing even larger amounts of the silicone fluid, it has been found that additions in excess of 6% by weight do not produce any significant advantages and can cause the granules to bridge in the hopper so that it is difficult to feed the material into the heating cylinder of the injection machine. It is generally preferred to add the silicone fluid in amounts less than 6% by weight because of its expense and because of the fact that silicone fluids contain relatively large amounts of inorganics which are undesirable in heat disposable patterns. The ash resulting from inorganics contained in heat disposable patterns cannot be readily burned out of the mold cavities when the patterns are melted, and large amounts of inorganic material in the patterns may require special mold gating to allow the ash to flow out of the mold cavities with the melted patterns. A good working range of the silicone fluid over which the most significant improvements in injection molding properties are attained is from about 0.1% to about 0.5% by weight of the pattern material.

As is commonly known, silicone fluids vary widely in viscosity. For example, a typical commercially available product is produced in any viscosity between 0.65 and 1,000,000 centistokes. While silicone fluids having viscosities over this entire range can be used in accordance with the present invention, it has been found that the very low viscosity fluids tend to be volatile at the injection temperatures and that the high viscosity fluids are difficult to mix with the solid granules. A preferred working range of viscosities is from about 20 to 500 centistokes at temperatures of from about 130° to 250°F.

In an illustrative example of the invention, a granulated, injection moldable pattern composition was prepared having the following formulation, the percentages being specified as percentages by weight:

| | |
|---|---|
| Polymerized rosin (Poly-Pale Resin sold by Hercules Powder Company) | 43% |
| Microcrystalline Wax (Sun Wax 5825 sold by Sun Oil Company) | 9% |
| Fischer-Tropsch Wax (F-T 300 sold by Dura Commodities Corporation | 14% |
| Paraffin Wax (Sun Wax 5512) | 19% |
| Ethylene/vinyl Acetate Polymer (Elvax Grade 250 sold by E. I. duPont de Nemours & Company, Inc.) | 15% |

A silicone fluid was admixed with the granulated material by tumbling it in a rotating drum. The fluid was added in an amount of about 0.3% by weight of the total weight of the resulting material. The silicone fluid was a dimethyl polysiloxane sold by Dow Corning under the tradename Dow Corning 200 Fluid, 350 Centistoke grade, the fluid having a viscosity of approximately 260 centistokes at 130°F.

The material prepared according to this example was injection molded using a Van Dorn plastic injection machine operating at approximately 800 psi line pressure and with an injection temperature of approximately 130°F. to form a plurality of patterns of a typical commercial part suitable for manufacture by precision casting. The injection molded patterns included the gates and runner system. The patterns were free of defects, including air entrapment and surface cavitations, and were used to produce excellent investment castings. The injection molding operation was carried out automatically without lubricating the die between shots.

It will be apparent from the foregoing that the invention provides a novel pattern material having superior injection molding characteristics. More particularly, the addition of a silicone fluid to a wax and resin-base, injection moldable composition results in a self-lubricating effect which makes it unnecessary to lubricate the injection dies between shots and also makes it possible to reduce the injection temperatures. The addition of the silicone fluid also obtains significant improvements in the physical characteristics of the injected parts, including the elimination of air entrapment and surface defects.

Many variations and modifications of the invention will be apparent to those skilled in the art in view of the foregoing detailed disclosure. Therefore, it is to be understood that, within the scope of the appended claims, the invention can be practiced otherwise than as specifically described.

What is claimed is:

1. A material consisting essentially of a solid, granulated, injection moldable, thermoplastic composition containing wax in an amount of at least 10% by weight of said composition, the granules of said composition being coated with a dimethyl polysiloxane fluid, and said polysiloxane fluid being present in an amount of at least 0.03% by weight of said material.

2. A material as claimed in claim 1 in which the polysiloxane fluid is present in an amount of 0.1% to 0.5% by weight of said material.

3. A material consisting essentially of a solid, granulated, injection moldable thermoplastic composition containing a solidified blend of wax and compatible resin, the granules of said thermoplastic composition being coated with a dimethyl polysiloxane fluid, and said polysiloxane fluid being present in an amount of at least 0.03% by weight of said material.

4. A material consisting essentially of a solid, granulated, injection moldable thermoplastic composition containing at least 50% by weight of a solidified blend of wax and compatible resin, said wax being present in an amount of at least 10% by weight of said blend, the granules of said thermoplastic composition being coated with a dimethyl polysiloxane fluid, and said polysiloxane fluid being present in an amount of at least 0.03% by weight of said material.

5. A material as claimed in claim 4 in which the polysiloxane fluid is present in an amount of 0.1% to 0.5% by weight of said material.

6. A material consisting essentially of a solid, granulated, injection moldable, thermoplastic composition containing at least 50% by weight of a wax and resin blend, including a paraffin wax and an ethylene/vinyl acetate polymer, the granules of said thermoplastic composition being coated with a dimethyl polysiloxane fluid, and said polysiloxane fluid being present in an amount of at least 0.03% by weight of said material.

7. A material as claimed in claim 6 in which said ethylene/vinyl acetate polyer is present in an amount of from 5% to 40% by weight of said blend, and in which said paraffin wax is present in an amount of at least 10% by weight of said blend.

8. A material consisting essentially of a solid, granulated, injection moldable thermoplastic composition which is at least 50% by weight of a blend of the following ingredients: an ethylene/vinyl acetate polymer in an amount of from 5% to 40% by weight of said blend, and wax in an amount of from 10% to 50% by weight of said blend, said wax consisting at least partially of a paraffin wax; the granules of said thermoplastic composition being coated with a dimethyl polysiloxane fluid, and said polysiloxane fluid being present in an amount of at least 0.03% by weight of said material.

9. A material consisting essentially of a solid, granulated, injection moldable thermoplastic composition which is at least 50% by weight of a blend of ethyl cellulose and a fatty acid ketone, the granules of said thermoplastic composition being coated with a dimethyl polysiloxane fluid, and said polysiloxane fluid being present in an amount of at least 0.03% by weight of said material.

10. A material as claimed in claim 9 in which said fatty acid ketone is selected from the group consisting of laurone and stearone.

11. A material as claimed in claim 10 in which said ethyl cellulose is present in an amount of from 50% to 70% by weight of said blend and said fatty acid ketone is present in an amount of from 20% to 80% by weight of said blend.

12. A material as claimed in claim 11 in which the polysiloxane fluid is present in an amount of from 0.1% to 0.5% by weight of said material.

* * * * *